United States Patent [19]

Martin et al.

[11] Patent Number: 4,781,939

[45] Date of Patent: Nov. 1, 1988

[54] LAYERED MEAT EMULSION PRODUCT AND METHOD OF PRODUCING SAME

[75] Inventors: R. Craig Martin, Moorpark; William Wu, Granada Hills, both of Calif.

[73] Assignee: Nestec, S.A., Vevey, Switzerland

[21] Appl. No.: 82,767

[22] Filed: Aug. 11, 1987

Related U.S. Application Data

[63] Continuation-in-part of Ser. No. 923,943, Oct. 28, 1986.

[51] Int. Cl.$^4$ ................................................ A23L 1/31
[52] U.S. Cl. ..................................... 426/646; 426/513; 426/802
[58] Field of Search ................ 426/646, 513, 802, 486

[56] References Cited

U.S. PATENT DOCUMENTS 4,332,823 6/1982 Buemi .................................. 426/646
4,450,183 5/1984 Steinberg et al. ................... 426/646

*Primary Examiner*—George Yeung

[57] ABSTRACT

A meat emulsion containing a mix of meat materials with the emulsion having a protein to fat ratio of at least about 1.5:1 and a moisture content in the range of about 45% to 80% is processed under conditions which rapidly heat the emulsion to a temperature of above the boiling point of water at which temperature protein coagulation proceeds at a very rapid rate. The hot meat emulsion is introduced by centrifugal force into a confined holding tube in which the emulsion is retained for a relatively short period of time during which the protein coagulates to set the emulsion and provide a firm meat emulsion product, with the emulsion being maintained at a pressure greater than the vapor pressure of emulsion water. When the protein has coagulated sufficiently to form a firm emulsion, the emulsion pressure is reduced below the vapor pressure of the emulsion water so that water in the emulsion is vaporized, and pressurized steam is periodically injected into the emulsion mass to form a set meat emulsion product having a plurality of distinct emulsion layers which are bonded together. The resulting product is discharged from the holding tube in the form of discrete pieces or chunks having a distinct layered structure which simulate pieces of natural meat in texture and appearance.

21 Claims, No Drawings

LAYERED MEAT EMULSION PRODUCT AND METHOD OF PRODUCING SAME

This application is a continuation-in-part of copending patent application Ser. No. 923,943, filed Oct. 28, 1986.

BACKGROUND OF THE INVENTION

This invention relates to the production of a meat emulsion product having a layered, meat-like appearance and texture. More particularly the invention relates to a method of processing a meat emulsion under conditions which result in the production of a layered, non-expanded product in the form of chunks or pieces which simulate natural meat chunks in texture, appearance, and consistency.

Meat emulsions, which are comminuted meat products, are well known in the food industry and are widely used in the production of products such as balogna, frankfurters and other sausage products. Such meat emulsion products are prepared by mixing, chopping, and emulsifying a mixture of raw meat materials, such as lean skeletal beef and pork and meat by-products, with ice, salt, spices and curing salts in such a manner as to produce an emulsion which contains fine fat particles coated with protein dissolved from the meat ingredients. The resulting meat emulsion is then stuffed into suitable casings, which serve as processing molds, and are heated at increasing temperatures of from 55° C. to 77° C. for extended periods of time which may vary between about 1 to 8 hours or more, depending on the volume of the meat emulsion being processed. Upon such heating, the protein in the meat emulsion coagulates or sets solid and entraps the fat particles in the protein matrix thereby forming a firm meat emulsion product. Such meat emulsion products are a uniform homogeneous mass which contain no discrete particles of meat and retain the shape of the casing when set.

In recent years in order to reduce the cost of certain food products to consumers, there has been an increasing demand for chunky food products which resemble chunks or pieces of natural meat in appearance, texture and physical structure, and which may be used as a partial or complete replacement for the more expensive natural meat chunks in food products such as stews, pot pies, casseroles, canned foods and pet food products. Chunky meat products are highly desirable in both human foods and pet foods both from aesthetic quality and consumer appeal. Because of this desirability and the high ingredient cost of natural meat chunks, there is a need for replacement of such expensive natural meat chunks in foods with more economical chunky products which simulate natural meat chunks in shape, appearance and texture, and which retain their shape, appearance and texture when subjected to commercial canning and retorting procedures.

Heretofore, efforts directed to providing such simulated natural meat chunks have been directed to producing such products from vegetable protein sources using extrusion-expansion techniques. Although the products of such extrusion-expansion procedures have met with some acceptance in the food industry, their use has been limited primarily to use as meat extenders. Since such products lack the appearance and texture of natural meat they are not generally suitable for use as full substitutes for meat. Similarly, meat emulsion products produced by conventional procedures, which are in the form of a uniform, homogeneous mass, lack the structure, texture and appearance of natural meat chunks and are not suitable for use in applications in which the use of simulated natural meat chunks is desired.

SUMMARY OF THE INVENTION

The present invention provides for the production of a meat emulsion product in the form of distinct chunks or pieces having a plurality of juxtaposed, manually separable meat-like layers resembling a chunk of natural meat in appearance, texture, and consistency. The meat emulsion chunks of this invention are suitable for use as a partial or complete replacement for more expensive natural meat chunks in both human foods and animal foods, and retain their integrity and shape when subjected to commercial canning and sterilization procedures such as those required in the production of canned high moisture food products.

The meat emulsion chunks of the present invention are produced by a process which includes comminuting a mix of meat material, such as meat (including fish and poultry) and/or meat by-products, under conditions which form a meat emulsion One or more dry proteinaceous materials may, if desired, be included in the meat emulsion to increase the protein content of the emulsion, particularly if the meat mix contains a relatively large proportion of low binding or filler meats. The meat emulsion is deaerated to remove air pockets from the emulsion, and is then comminuted under conditions which concurrently increases emulsion fineness and rapidly heats the emulsion to a temperature above the boiling point of water, and preferably between 104° C. 118° C., at which temperature coagulation and denaturing of protein in the emulsion proceeds at a very rapid rate. The hot emulsion is immediately pumped by centrifugal force from the comminuting equipment directly into a confined processing zone, such as an elongated tube, while maintaining the emulsion mix at a pressure above the vapor pressure of the mix. The emulsion is retained in the elongated tube under such pressure until the protein has coagulated to an extent to set the emulsion and form a firm emulsion product, that is, within 5 minutes and generally for between a few seconds to about 3 minutes.

Flow control means, such as a pinch valve, may be mounted in the elongated tube at or near the inlet of the tube to regulate the flow of emulsion through the tube so that the emulsion mix is maintained at the desired pressure until the emulsion has sufficiently set. Additional flow control means responsive to the pressure of the emulsion mix in the tube may be provided in the elongated tube at one or more points along the length of the tube to further assist in regulating the flow of emulsion through the tube.

When the meat emulsion has set to a degree sufficient to form a firm emulsion product, pressure at the downstream end of the set emulsion in the tube is reduced to a value below the vapor pressure of the emulsion thereby generating steam in situ in the emulsion. The presence of steam generated in the confined emulsion mass by the vaporization of water while the protein is undergoing rapid coagulation facilitates the formation of a distinct layered structure in the emulsion and serves to disrupt the emulsion mass into discrete chunks or pieces which are discharged from the tubular processing zone. Additional steam at a pressure of 0.3 to 3 Kg/cm$^2$ may be injected into the emulsion at periodic intervals at one or more points along the length of the tube to further assist in the cyclic discharge of the emulsion from the elongated tube.

The meat emulsion chunks discharged from the elongated tube have a layered, non-expanded structure containing a plurality of distinct layers of meat emulsion bonded together, with the layers being manually separable. These meat emulsion chunks have an appearance, texture and structure closely approximating those of natural meat chunks. The layered meat emulsion pieces thus produced may be used as a partial or complete replacement for natural meat chunks in a variety of foods for human consumption or in animal foods, and may be used in foods prepared by canning and retorting operations.

DESCRIPTION OF THE INVENTION

In preparing the layered meat emulsion chunks in accordance with the method of the present invention, a mixture of natural meat materials, including both meat from mammals, fish or fowl and/or meat by-products, having the requisite quality, ingredient cost and palatability, is formulated, ground and emulsified. The meat and/or meat by-products used may be selected from a wide range of components, with the type and amount of meat material used in the formulation depending on a number of consideration such as the intended use of the product, the desired flavor of the product, palatability, cost, availability of ingredients, and the like. Both meat (i.e. skeletal tissue and non-skeletal muscle) from a variety of mammals, fowl and fish, and/or meat by-products (i.e. the non-rendered clean parts, other than meat, derived from slaughtered mammals, fowl or fish) may be used as the meat material. Thus, the term meat material as used herein is understood to refer to non-dehydrated meat and/or meat by-products, including frozen materials. If the product is intended for human consumption, any of the meats and meat by-products used in the production of conventional meat emulsion products may be used in the present invention, including meats such as whole-carcass beef and mutton, lean pork trim, beef shanks, veal, beef and pork cheek meat, and meat by-products such as lips, tripe, hearts and tongues. If the product is intended for use as a pet food product, the meat mix may contain, in addition to the meat materials described above, any of the meat by-products which are approved for use in animal foods, such as mechanically deboned beef, chicken or fish, beef and pork liver, lungs, kidney, and the like. Typically the meat material is formulated to contain a maximum of about 25%, and preferably below about 15%, by weight of fat.

Additives which are used in conventional meat emulsion products may be mixed with the meat material and included in the meat emulsion of the present invention, such as salt, spices, seasoning, sugar, and the like in amounts sufficient to provide the product with desired taste characteristics. In addition, minor amounts of other dry ingredients such as, for example, vitamins, minerals, flavors, and the like, may also be added to the meat emulsion. One or more dry proteinaceous materials, such as, for example, wheat gluten, soy flour, soy protein concentrate, soy protein isolate, egg albumin and nonfat dry milk, may also be included in the meat emulsion to improve emulsion stability and binding, impart flavor, and reduce formulation costs. The inclusion of the dry proteinaceous materials in the meat emulsion is particularly advantageous in the production of product intended for use as a pet food, for it enables the processor to use meat materials having a protein to fat ratio and myosin to total protein ratio which would otherwise be of marginal acceptability for use in preparing meat emulsion products If a dry proteinaceous material is included in the meat emulsion, the amount used may vary from about 5% to about 35% by weight of the emulsion, depending on such factors as the intended use of the product, the quality of meat material used in the emulsion, ingredient cost considerations, and the like. Generally, as the fat content and moisture content of the meat material used are increased, the level of dry proteinaceous material in the emulsion is increased accordingly.

While the formulation of the meat emulsion may vary widely, the emulsion, including the dry proteinaceous material, should have a protein to fat ratio sufficient to form a firm meat emulsion product upon coagulation of the protein with no sign of emulsion instability, and the protein content of the emulsion must be such as will enable the emulsion, upon being heated to a temperature above the boiling point of water, to coagulate and form a firm emulsion product within a short period of time, that is, within about 5 minutes, and, preferably within 3 minutes, after being heated to such a temperature. Thus, the meat materials and the additives, including the dry proteinaceous material (if used) are mixed together in proportions such that the meat material is present in an amount of between about 65% to 95% by weight, and preferably from about 75% to 85% by weight of the meat emulsion, with the meat emulsion having a protein to fat ratio of at least about 1.5:1, with a protein to fat ratio of between about 2:1 to 7:1 being preferred. While a higher protein to fat ratio may be used in the meat emulsion, it is generally not preferred since it would increase ingredient costs without providing any significant benefits. It is generally preferred to use a blend of meat and meat by-products as the meat material in the meat emulsion. However, the meat emulsion may be formulated using only meat by-products as the meat material, provided that the resulting meat emulsion, including the dry proteinaceous material (if used), has a protein to fat ratio of at least about 1.5:1.

In addition, the meat emulsion should be formulated to contain between about 45% to 80% by weight moisture, with the moisture content preferably being controlled between about 50% to 75% by weight of the meat emulsion, i.e. the meat materials and additives. The exact concentration of water in the emulsion will, of course, depend on the amount of protein and fat in the emulsion.

The meat mix selected for use is passed through a grinder to reduce the meat material into pieces of substantially uniform size. Generally it is preferred to pass the meat through a grinder equipped with a 1 cm or smaller grinding plate. While satisfactory results may be obtained by grinding the meat to a particle size larger than 1 cm, the use of such larger meat particles is generally not preferred. If the meat materials to be used are in a frozen condition, they must first be prebroken or cut into pieces in order to reduce the size of the pieces going into the grinder. While the size of the pieces will depend on the size of the meat grinder intake, normally the frozen meat material is cut into pieces about 10 cm square.

After grinding, the mix of meat particles is conveyed to a holding tank in which the meat mix preferably is heated to a temperature of between about −1° C. to 7°

C., such as by hot water jacketing, steam injection, and the like to facilitate pumping of the meat mix.

The mix of ground meat particles is then comminuted under conditions which emulsify the meat material and form a meat emulsion in which the protein and water of the meat mixture form a matrix that encapsulates fat globules. The meat material may be emulsified by any conventional procedure and equipment commonly used in meat emulsification such as by using a mixer, blender, grinder, silent cutter chopper, emulsion mill, and the like which is capable of breaking up and dispersing the fat as globules in the protein slurry to form an emulsion. Typically the temperature of the meat emulsion increases during the emulsification process. This heating of the meat emulsion is not objectionable as long as the temperature does not increase to the point that protein denaturation begins to occur at an undesirable rate at this stage of the process. The temperature of the meat mixture during emulsification should be maintained below about 49° C. in order to minimize protein denaturing at this stage of the process. According to a preferred embodiment of the invention, the meat material is passed through an emulsion mill to emulsify the meat material with the emulsion being heated to a temperature between about 10° C. to 49° C., preferably between about 35° C. to 46° C.

The additives to be incorporated in the meat emulsion, including dry proteinaceous material (if used), may be added to the meat mix prior to emulsification. Alternatively, it is frequently preferable to incorporate the additives, particularly the dry proteinaceous material, in the meat mix after emulsification of the meat. Since the addition of the dry proteinaceous material increases the viscosity of the emulsion, better emulsification is obtained when the meat mix is emulsified before the addition of the dry protein aceous material, which results in the formation of a viscous meat emulsion.

The viscous meat emulsion thus obtained by inclusion of the dry proteinaceous material in the emulsion preferably is then deaerated by any conventional procedure such as by processing it through a vacuum stuffer, to remove occluded air which could disrupt the product matrix and reduce its binding capacity.

After deaeration, the meat emulsion is again comminuted to increase the fineness of the emulsion and is rapidly heated to a temperature above the boiling point of water, at which temperature the coagulation of protein in the emulsion proceeds so rapidly that the emulsion is set and a firm emulsion product formed within a very short period of time. It has been found that rapidly heating the viscous meat emulsion to a temperature above the boiling point of water, and generally between 104° C. and 118° C., will result in the protein in the emulsion coagulating to set the emulsion and form a firm emulsion product within about 5 minutes and typically from a few seconds to about 3 minutes after heating. In addition, heating the meat emulsion, which has a moisture content of about 45% to 80% by weight, to such temperature results in vaporization of the emulsion water to form steam in the body of the emulsion mass when it is at or near atmospheric pressure. This internal generation of steam in the emulsion is a significant factor in the production of product having the desired distinct layered structure. Preferably the emulsion is processed in equipment in which the emulsion is heated to such elevated temperatures while it is being comminuted such as by mechanical heating and/or steam injection. According to a preferred embodiment, the viscous meat emulsion, which is at a temperature of between about 30° C.–40° C., is pumped through an emulsion mill in which the meat emulsion is subjected to shearing to increase the fineness of the emulsion and almost simultaneously heat the emulsion to between about 104° C.–118° C., through rapid mechanical heating and/or steam injection. Thus, the deaerated emulsion preferably is heated to such elevated temperatures in a period of less than about 60 seconds. When the emulsion has been heated to such an elevated temperature in this manner, further significant shearing and cutting of the emulsion should be avoided. While the meat emulsion may be heated to a temperature above 118° C., such higher temperatures are generally not advantageous. Control of the emulsion temperature within the desired range can be effected adjusting such factors as the feed rate into the emulsion mill, the rotational speed of the emulsion mill, and the like, and can readily be determined by those skilled in the art.

The hot meat emulsion, which is at a temperature above the boiling point of water and preferably in the range of between about 102° C. to 118° C., is pumped under positive pressure by a centrifugal force directly from the equipment in which it is comminuted and heated into a confined processing zone, which preferably is in the form of an elongated tube, and is retained in the confined processing zone at a pressure above the vapor pressure of the emulsion until the protein in the meat emulsion has coagulated sufficiently to set the emulsion and form a firm emulsion product, which retains its shape and layered structure when discharged from the tubular processing zone. At such elevated temperature, protein coagulation proceeds at a very rapid rate. While the period of time required for the hot emulsion to set sufficiently to form a firm product will depend on a number of factors, such as the temperature to which the emulsion is heated and the amount and type of protein in the emulsion, a residence time of between a few seconds to about 3 minutes, and usually between about 1 to 1.5 minutes, in the elongated tube is generally sufficient for the protein to sufficiently coagulate and form a firm emulsion product which will retain its shape, integrity and physical characteristics. The residence time in the elongated tube can be controlled by adjusting the flow rate of the emulsion to the elongated tube and/or by adjusting the length of the elongated tube. The dimensions of the holding tube are not critical but must be sufficient to provide the emulsion with sufficient retention time in the tube for the emulsion to set. In practice, tubes having a length of between about 4.5 m and 12.2 m and an internal diameter of between about 4.5 cm and 15.2 cm provide sufficient retention time to form a firm emulsion product. Tubes of various cross-sectional shapes may be used, such as circular, square, octagonal, and the like.

According to a preferred embodiment of the invention, flow restriction means, such as a pinch valve, is mounted in the tubular processing zone at or near the inlet of the tube to restrict the flow of the hot emulsion from the emulsion mill into the tube and maintain the hot emulsion at a pressure in excess of the vapor pressure of emulsion water. Satisfactory results may be obtained when the back pressure on the emulsion pumped from the emulsion mill to the tube is in the range of about 1.4 to 4.2 Kg/cm$^2$. Preferably, this flow restriction means is responsive to the pressure of the emulsion and maintains the back pressure at a relatively constant predetermined value despite fluctuations in the rate of emulsion discharge from the emulsion mill.

Preferably steam, at a pressure of about 0.3 to 3 Kg/cm$^2$, is intermittently injected into the hot meat emulsion in the elongated tube at one or more a points along the length of the tube. Such injection of steam into the emulsion is intermittent rather than continuous, and is generally injected at time intervals of about one-half the residence time of the emulsion in the tubular processing zone. For example, if the length of the tube and the throughput rate of the emulsion in the tube are such that the retention time of the emulsion in the tube is 120 seconds, steam is injected into the emulsion at intervals of about 60 seconds, with the steam being injected for a period of from 1 to 5 seconds per injection.

The injection of such pressurized steam into the emulsion in the confined zone further promotes development of the layered structure in the emulsion, and assists in discharging the set emulsion product from the elongated tube. Thus, steam which is generated internally in the emulsion by vaporization of emulsion water, and steam which is periodically injected into the emulsion accumulates within the emulsion mass in the confined processing zone so that the internal pressure in the confined zone increases until it is sufficient to disrupt the meat emulsion mass adjacent the discharge end of the tube into discrete pieces and cause the pieces to be rapidly discharged from the tube into atmospheric conditions. When this is repeated, the discrete meat emulsion pieces are intermittently discharged from the tube.

In order to maintain the hot emulsion in the tubular processing zone at a pressure greater than the vapor pressure of the emulsion until the protein has coagulated sufficiently to form a firm product, suitable flow control means, such as a pinch valve which is responsive to pressure of the emulsion in the tube, preferably is mounted at one or more points along the length of the tube. If utilized, such flow control means is mounted in the tube at a point where a firm emulsion product has already been formed, and typically is mounted intermediate the midpoint and the discharge end of the tube. The flow control means, such as a pinch valve, is adapted to open and close in response to pressure of the emulsion in the tube to thereby control the flow of emulsion. Injection of pressurized steam into the emulsion is coordinated with the opening of the air valve to assist in the discharge of the set emulsion from the tubular processing zone. According to one embodiment, a pinch valve is mounted in the elongated tube at a point within the last 50% of the tube where the emulsion has set sufficiently to form a firm emulsion product. This valve is adapted to open when the pressure of the emulsion in the tube between the tube inlet and the valve reaches a predetermined value and to close when the emulsion pressure drops below a predetermined value, lower than that at which the valve opens. The pressure value at which this valve opens is sufficiently high to ensure that the emulsion in the tube upstream of the valve will be at a pressure higher than the vapor pressure of the emulsion water until the valve is opened, at which time the emulsion pressure will drop below the vapor pressure of the emulsion. When the air valve opens, pressurized steam is intermittently injected into the emulsion at one or more points upstream of the air valve to facilitate the discharge of the set emulsion from the tube. As the air valve opens and a portion of the set emulsion adjacent the air valve is discharged from the tube, the pressure on the emulsion upstream of the air valve drops below the vapor pressure of the emulsion water to generate steam in the hot emulsion due to the vaporization of emulsion water. The effect of the combination of pumping the hot emulsion into the tubular processing zone by centrifugal force, subjecting the hot confined emulsion to steam pressure while the protein is coagulating at a rapid rate, together with the pressure exerted on the emulsion by pumping it through a confined zone, provides the meat emulsion with a layered, meat-like structure and appearance which is retained upon discharge from the tube. In addition, the internal generation of steam in the hot confined emulsion serves to disrupt the meat emulsion mass into discrete pieces which, by virtue of the steam pressure are rapidly discharged from the tubular processing zone into atmospheric conditions.

While the use of one or more such pinch valves or other flow control means in the tubular processing zone is a preferred embodiment in that it facilitates control of operating conditions, satisfactory product may be produced without the use of a flow control valve in the elongated tube.

The set, layered meat emulsion pieces discharged from the confined processing zone are in the form of discrete pieces or chunks having a temperature of about 98° C.–100° C., and a moisture content of about 50% to 65%, with the pieces varying in size. Upon discharge from the processing zone, the pieces are rapidly cooled by evaporative cooling to a temperature in the range of 83° C.–93° C. If desired, suitable cutting means, such as a rotary cut-off knife, a water jet knife, a knife grid, or the like may be mounted at the discharge end of the elongated tube to cut the chunks into pieces of a desired size, e.g. from about 1.2 cm to 5 cm or more. The size of the pieces into which the firm emulsion chunks may be cut will, to a large extent, depend upon the intended use of the product. The emulsion pieces thus provided comprise discrete, unitary, irregularly shaped pieces or chunk of set meat emulsion which have a plurality of separate, distinct layers bonded together and resemble chunks of natural meat in appearance and texture. The meat emulsion chunks thus formed have excellent integrity and strength and will retain their shape and layered characteristics when subjected to commercial canning and retorting procedures such as those required in the production of canned foods having a high moisture content.

The layered meat emulsion pieces discharged from the confined processing zone may be conveyed to a dryer to remove a large portion of the moisture therefrom, and the dried product collected and stored. Alternatively, the layered meat emulsion pieces may be conveyed from the elongated tube directly to a canning operation in which layered chunks are filled into cans together with other ingredients, such as sauce, gravy, and the like, and the cans retorted. For example, in the production of a canned pet food product, a suitable gravy may be prepared by heating a mixture of water, starch and condiments. The layered meat emulsion chunks and gravy are filled into cans in the desired proportions, the cans are vacuum sealed and are then retorted under time-temperature conditions sufficient to effect commercial sterilization. Convention retorting procedures may be used. Typically, a retorting temperature of about 118° C.–121° C. for approximately 65–90 minutes is satisfactory in producing a commercially sterile product.

The following examples illustrate the invention. In the examples and elsewhere herein, parts and percentages are expressed by weight, unless otherwise indicated.

EXAMPLE 1

A canned pet food product comprising chunks of layered meat emulsion in an aqueous gravy is prepared by the following procedure.

Blocks of frozen meat are first cut or broken into pieces about 10 cm inches in size and the pieces are ground in conventional meat grinder equipped with a 1 cm plate. The proportions of meat material used are as follows:

| Meat Type | Parts by wt. |
|---|---|
| Mechanically deboned beef | 60 |
| Lungs | 25 |
| Liver | 15 |

The ground meat is introduced into a mixer in which it is heated by steam injection to a temperature of about 0° C. After mixing, the blend of ground meat materials is fed into an emulsion mill in which the meat is cut and sheared to form a meat emulsion which is heated by mechanical working during emulsification to a temperature of between about 15.6° C. to 43° C. The warm meat emulsion is pumped from the emulsion mill into a continuous mixer where it is thoroughly admixed with a blend of dry ingredients containing the dry proteinaceous materials, wheat gluten and soy flour together with vitamins, minerals and spices to form a thickened, viscous meat emulsion containing about 80% meat material, 19% dry proteinaceous material, and the balance vitamins, minerals and spices. The viscous meat emulsion thus formed is pumped from the continuous mixer into a vacuum-stuffer to deaerate the emulsion.

After deaeration the viscous emulsion, which is at a temperature of about 30° C. to 40° C., is pumped into an emulsion mill in which the emulsion is cut and sheared under conditions to increase the fineness of the emulsion and almost simultaneously heat the emulsion to a temperature of about 104° C. to 113° C. At such a emulsion temperature, protein coagulation proceeds very rapidly, so that a firm meat emulsion product will be formed within 2 minutes after heating.

The hot emulsion is pumped directly from the emulsion mill into an elongated tube having an internal diameter of 6.35 cm and a length of 6.1 m. The flow rate of the emulsion through the tube is controlled to provide the emulsion with a residence time of about 2 minutes in the tube.

Steam, at a pressure of between 0.5–1 Kg/cm$^2$, is injected into the emulsion at a point within the first 25% of the length of the tube, with the steam being injected at 60 second intervals for a period of about 3 seconds per injection. A firm emulsion product is intermittently discharged from the elongated tube in the form of discrete irregularly shaped meat-like pieces or chunks varying in length from about 1.27 cm to about 5.1 cm or more, with each of the chunks having a plurality of juxtaposed layers of set meat emulsion bonded together and resembling natural meat chunks in appearance and texture. The distinct layers of the chunks, while being bonded together are manually separable, similar to cutting along the grain of a chunk of meat. The individual chunks discharged from the tube are at a temperature of about 99° C. and have a moisture content of between 50% to 65%. The resulting layered meat emulsion pieces are filled into cans, topped with an aqueous starch-containing gravy, sealed and retorted under conditions sufficient to provide a commercially sterile product. Upon retorting, the layered pieces retain their shape, integrity, and meat-like appearance and texture.

EXAMPLE 2

The procedure described in Example 1 is repeated, with the exception that the following proportions of meat material are used:

| Meat Type | Parts by wt. |
|---|---|
| Fish | 32 |
| Chicken necks | 29 |
| Liver | 25 |
| Spleen | 14 |

The meat ingredients are ground and emulsified, and a blend of dry ingredients containing wheat gluten and soy protein concentrate is added to the emulsion with vigorous agitation to form a thickened, viscous meat emulsion containing about 80% meat material, 19% dry proteinaceous material, vitamins, minerals and spices. The viscous meat emulsion has a fat content of less than 12%, a moisture content of between 55% to 65%, and a protein to fat ratio of between 2.25–2.5:1. After deaeration, the viscous emulsion is pumped into an emulsion mill in which the emulsion is subjected to shearing forces to increase the fineness of the emulsion and heat the emulsion to a temperature in the 104° C. to 113° C. range, and is pumped from the emulsion mill directly into the inlet of an elongated holding tube by a centrifugal force. The holding tube, which has a length to diameter ratio of about 30:1, is provided with two pinch valves, one mounted at the inlet end of the tube, and the other mounted at a point within the last 50% of the tube length. The valve at the inlet end of the tube restricts the flow of hot emulsion into the tube to maintain the emulsion upstream of the inlet valve under a relatively constant pressure in the range of about 2.0–3.5 Kg/cm$^2$. As the hot emulsion is pumped through the inlet valve, it fills the tube portion between the valves, with the emulsion being under a pressure greater than the vapor pressure of the emulsion water. The downstream pinch valve is adapted to open when the pressure of the emulsion intermediate the two valves reaches a predetermined level in the range of about 0.35–1.8 Kg/cm$^2$. When the second valve opens, pressurized steam (0.5–1 Kg/cm$^2$) is intermittently injected into the emulsion at one or more points upstream of the second valve whereby a section of the set emulsion adjacent the second valve is forced through the valve and discharged from the tube. This opening of the second valve and discharge of a portion of the emulsion causes the emulsion pressure intermediate the two valves to drop below the vapor pressure of the emulsion water so that emulsion water is vaporized and forms steam in situ in the emulsion. The rapid generation of steam internally in the confined emulsion, together with the intermittent injection of pressurized steam into the emulsion facilitates the formation of a layered structure in the emulsion and disrupts the emulsion mass into chunks, which are rapidly discharged form the tube. When the pressure in the tube section between the two valves drops to a predetermined value, the second valve closes and the cycle is repeated. A firm emulsion product is cyclically discharged from the tube in the form of discrete irregularly shaped chunks having a layered, meat-like appearance and texture, which retain their shape, integrity, appearance and texture upon canning and retorting.

Although the present invention has been described with reference to specific examples and preferred embodiments, it will be understood that changes, modifications and variations of composition and procedure may be made within the principle and scope of the invention as set forth in the appended claims.

What is claimed is:

1. A method of producing a meat emulsion product having a layered, meat-like appearance and texture resembling a chunk of natural meat, which comprises
    forming a meat emulsion containing a mix of meat materials with the emulsion having a protein to fat ratio of at least about 1.5:1 and a moisture content of between about 45% to 80% by weight,
    deaerating said meat emulsion,
    comminuting and heating the meat emulsion to a temperature above the boiling point of water,
    introducing the heated emulsion by centrifugal force into a confined processing zone while maintaining the emulsion under a pressure greater than the vapor pressure of the emulsion water,
    maintaining the heated emulsion under such pressure in the confined zone until the protein is coagulated to form a firm emulsion mass,
    reducing the pressure on the emulsion in the confined zone to below the vapor pressure of the emulsion water to vaporize emulsion water, and intermittently injecting pressurized steam into the emulsion in the confined zone whereby the firm emulsion mass is disrupted to form discrete pieces of set emulsion having a plurality of distinct layers bonded together, and
    discharging the layered meat emulsion pieces from said confined processing zone.

2. The method defined in claim 1 in which the meat emulsion is formed by emulsifying the mix of meat materials and adding one or more dry proteinaceous materials thereto to provide a viscous emulsion containing between about 65% to 95% by weight of meat materials and having a protein to fat ratio of at least about 1.5:1.

3. The method defined in claim 2 in which the viscous meat emulsion is heated to a temperature of between about 104° C. to 118° C.

4. The method defined in claim 1 in which the confined processing zone is an elongated tubular member in which the heated meat emulsion is retained for a period of time sufficient for the emulsion to set.

5. The method defined in claim 1 in which steam having a pressure of about 0.3–3 Kg/cm$^2$ is intermittently injected into the meat emulsion in said confined processing zone.

6. The method defined in claim 4 in which flow of the heated meat emulsion into the tubular member is restricted so that the emulsion is maintained under a pressure greater than its vapor pressure.

7. The method defined in claim 6 in which the emulsion in the tubular member is maintained under a pressure greater than its vapor pressure until the protein in the emulsion has coagulated to an extent sufficient to form a firm emulsion.

8. The method defined in claim 7 in which the emulsion pressure in the tubular member is reduced below the emulsion vapor pressure when the protein has coagulated sufficiently to form a firm emulsion.

9. The method defined in claim 7 in which the flow of emulsion through the tubular member is restricted at a point intermediate the inlet end and discharge end of said tubular member so that the pressure of the emulsion in the portion of the tubular member upstream from the flow restriction is greater then its vapor pressure.

10. The method defined in claim 7 in which the restriction in the flow of emulsion through the tubular member is removed when the emulsion pressure in the tubular member reaches a predetermined value.

11. The method defined in claim 10 in which the flow restriction is removed when the emulsion pressure is in the range of between about 0.35 to 1.8 Kg/cm$^2$.

12. A method for producing a meat emulsion product having layered meat-like appearance and texture resembling a chunk of natural meat, which comprises
    formulating a meat mix containing a member selected from the group consisting of meat, meat by-products and mixtures thereof, and water;
    emulsifying said meat mix to form a meat emulsion,
    adding to said meat emulsion a dry proteinaceous material selected from the group consisting of wheat gluten, soy flour, soy protein concentrate, soy protein isolate, egg albumin, nonfat dry milk and mixtures thereof in an amount of from 15% to 35% by weight of the total formulation, with the emulsion having a protein to fat ratio of at least about 1.5:1,
    deaerating said meat emulsion,
    comminuting the meat emulsion under conditions which heat the emulsion to a temperature in the range of from about 104° C. to 118° C.,
    introducing the heated emulsion under pressure, while at a temperature above the boiling point of water, by centrifugal force into an elongated tubular member having a length sufficient that the protein in the meat emulsion coagulates to form a firm emulsion mass prior to discharge from said elongated tubular member, periodically reducing the pressure on the emulsion in said tubular member to below the vapor pressure of the emulsion water to form steam internally in the emulsion in said tubular member,
    periodically injecting steam under pressure into said meat emulsion at a point intermediate the inlet and discharge ends of said member, whereby the steam found internally in the emulsion and that injected into the emulsion facilitate layering of the meat emulsion and to disrupt the meat emulsion into discrete pieces having a plurality of distinct layers bonded together, and
    discharging the layered meat emulsion pieces from said tubular member.

13. The method defined in claim 12 in which the heated meat emulsion is retained in said tubular member for a period of less than about 3 minutes.

14. The method defined in claim 12 in which steam having a pressure of about 0.3–3 Kg/cm$^2$ is intermittently injected into the meat emulsion in said confined processing zone.

15. The method defined in claim 12 in which flow of the meat emulsion through the tubular member is restricted at one or more points along the tubular member to maintain the emulsion at a pressure greater than the emulsion vapor pressure at least until the protein in the emulsion has coagulated sufficiently to form a firm emulsion.

16. The method defined in claim 15 in which the flow of hot emulsion into the inlet of the tubular member is restricted so that the emulsion introduced into the tubular member is under a pressure greater than its vapor pressure.

17. The method defined in claim 16 in which the emulsion introduced into the tubular member is at a pressure of about 2.0–3.5 Kg/cm$^2$.

18. The method defined in claim 16 in which pressurized steam is intermittently injected into the emulsion at one or more points intermediate the inlet and discharge ends of the tubular member.

19. The method defined in claim 16 in which the flow of emulsion through the tubular member is restricted at a point intermediate the inlet and discharge ends of the tubular member where the emulsion protein has coagulated sufficiently to form a firm emulsion, so that the emulsion pressure in the portion of the tubular member upstream from the flow restriction is greater than the emulsion vapor pressure.

20. The method defined in claim 19 in which the restriction in the flow of emulsion through the tubular member is removed when the emulsion pressure reaches a predetermined value.

21. The product produced by the method of claim 1.

* * * * *